United States Patent [19]
Korth

[11] 3,836,097
[45] Sept. 17, 1974

[54] SILENCER
[76] Inventor: William P. Korth, 1210 N. Trumbull, Bay City, Mich. 48706
[22] Filed: Dec. 4, 1972
[21] Appl. No.: 311,653

[52] U.S. Cl. .............................. 244/1 N, 181/33 H
[51] Int. Cl. ............................................ B64c 21/02
[58] Field of Search .......... 244/1 N, 3.1; 181/33 H, 181/33 HA, 33 HB, 33 HC

[56] References Cited
UNITED STATES PATENTS
| 2,063,005 | 12/1936 | Payne | 244/1 N |
| 2,931,167 | 4/1960 | Leduc | 244/1 N |
| 2,938,334 | 5/1960 | McLafferty | 181/33 HA |
| 3,196,977 | 7/1965 | Sanders | 181/33 HB |
| 3,713,607 | 1/1973 | Hill et al. | 244/3.1 |

Primary Examiner—George E. A. Halvosa
Assistant Examiner—Barry L. Kelmachter

[57] ABSTRACT

A silencing device for use in aircraft to stop sonic boom and for eliminating contact with sun rays. The device, working on the principle of a gun silencer, consists of a cylindrical assembly with a central opening, a cylindrical side wall comprising an outer wall and perforated inner wall communicating with an inner space therebetween, and support means for securement to the wings of an airplane.

1 Claim, 4 Drawing Figures

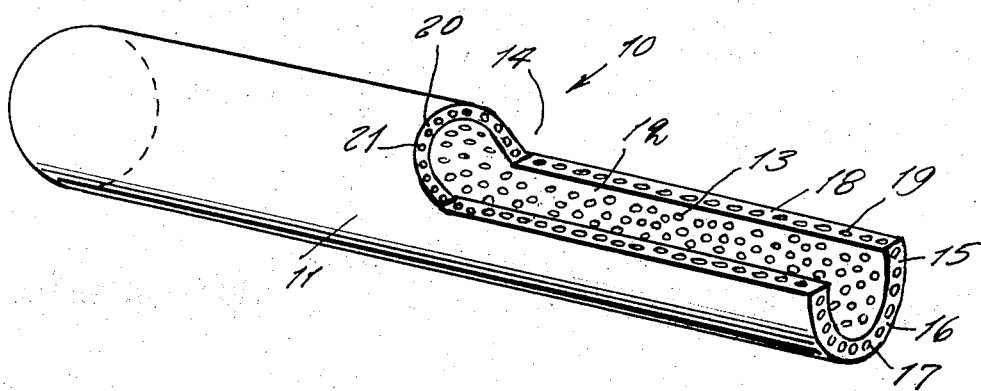
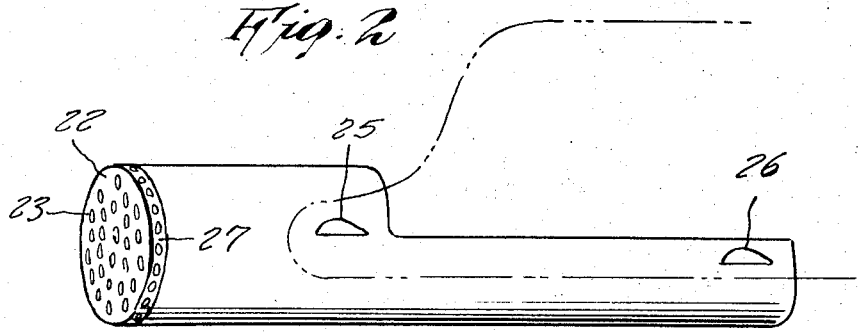
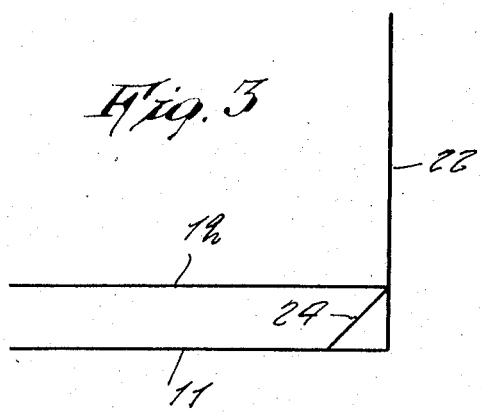
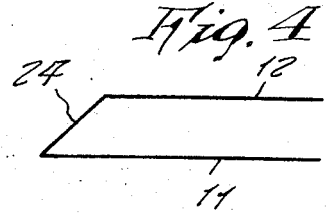

SILENCER

This invention relates generally to aircraft equipment.

A principle object of the present invention is to provide a device for an aircraft which will stop a sonic boom.

Another object is to provide a silencer which will stop penetrating sun rays and eliminate the hazard of exposure thereto and the resultant danger of acquiring cancer.

Yet another object is to provide a silencer for airplanes which is simple in design, inexpensive to manufacture, rugged in construction, easy to use, and efficient in operation.

These and other objects will be readily evident upon a study of the following specification and accompanying drawing wherein:

FIG. 1 is a perspective view of the invention.

FIG. 2 is a side elevation view thereof.

FIGS. 3 and 4 are diagramatic view showing the relationship of elements of the device.

Referring now to the drawing in detail, the reference numeral 10 represents an aircraft silencer according to the present invention wherein there is a cylindrical assembly that includes a cylindrical outer wall 11 and a cylindrical inner wall 12 contained therewithin on a common cylindrical axis so to form a space therebetween.

The inner wall 11 is provided with perforations 13 whereby there is air intercommunication from the space between the walls radially to the area encompassed by the inner wall 12 thereby causing sound waves passing through the silencer to dissipate energy by taking a devious path therethrough. Dissipation of sound wave energy results in a noise and sonic boom reduction effect.

One longitudinal end of the assembly is cut away to form the notch 14, forming terminal end portion 15 of generally semi-cylindrical configuration, with a semi-cylindrical end wall 16 with perforations 17 therethrough. Likewise an edge wall 18 along the notch 14 is provided with perforations 19 and an intermediate semi cylindrical end wall 20 has perforations 21.

An end wall 22 of the device has openings 23 therethrough. Perforations 17 communicate with perforations 23 to permit flow of air therethrough via the perforations 13 whereby the entire space between the walls and the entire area encompassed by the inner wall and the areas at each end of the silencer are all connected.

As shown in diagram of FIG. 3, the wall 22 has a 45 degree slope 24 with one inch holes at three inch centers which is offset to plate 22.

FIG. 4 shows modification whereby the semi-cylindrical notch 14 is provided with a rear end tapered at 45° to the axis causing gradual expansion.

The invention includes supports 25 and 26 so to secure the device to the plane.

Notch 14 provides for the rapid upward expansion and flow of air from the full cylindrical portion into the semi-cylindrical notch. Thus the airstream flowing into the notch 14 may undergo a substantial radially upward expansion while the lower portion of the airstream is guided through said notch. The partial containment in the notch results in gradual attenuation of noise generation.

Wall 22 has a 45 degree slope to provide a gradual transition from the full cylindrical portion to the semi-cylindrical notch thereby reducing turbulent outflow.

While various changes may be made in the detail construction, it is understood that such changes will be within the spirit and scope of the present invention as is defined by the appended claim.

I claim:

1. A cylindrical silencer for super sonic aircraft, comprising spaced coaxial cylindrical outer and inner walls having a semicylindrical end portion forming a terminal notch, including a transition portion sloping at 45° to the axis from the notch, including radial perforations through the inner wall, and longitudinal perforations through opposite transverse end walls.

* * * * *